US008065060B2

(12) United States Patent
Danko

(10) Patent No.: US 8,065,060 B2
(45) Date of Patent: Nov. 22, 2011

(54) COORDINATED JOINT MOTION CONTROL SYSTEM WITH POSITION ERROR CORRECTION

(75) Inventor: George Danko, Reno, NV (US)

(73) Assignee: The Board of Regents of the University and Community College System on Behalf of the University of Nevada, Reno, NV (US)

( * ) Notice: Subject to any disclaimer, the term of this patent is extended or adjusted under 35 U.S.C. 154(b) by 0 days.

(21) Appl. No.: 11/333,994

(22) Filed: Jan. 18, 2006

(65) Prior Publication Data
US 2007/0168100 A1    Jul. 19, 2007

(51) Int. Cl.
*G05B 19/19* (2006.01)

(52) U.S. Cl. .............. 701/50; 701/36; 701/116; 700/11; 700/13; 700/19; 700/28; 700/29; 700/30; 700/31; 700/44; 700/45; 700/54; 700/245; 700/251; 901/2; 901/9; 901/20

(58) Field of Classification Search ............... 701/50; 700/245
See application file for complete search history.

(56) References Cited

U.S. PATENT DOCUMENTS

| | | | |
|---|---|---|---|
| 4,156,835 A | 5/1979 | Whitney et al. | |
| 4,243,923 A | 1/1981 | Whitney et al. | |
| 4,763,276 A | 8/1988 | Perreirra et al. | |
| 4,771,389 A * | 9/1988 | Takahashi et al. | 700/250 |
| 4,773,025 A * | 9/1988 | Penkar et al. | 700/261 |
| 4,829,418 A * | 5/1989 | Nielsen et al. | 700/59 |
| 4,889,466 A * | 12/1989 | Jindai et al. | 414/694 |
| 4,893,254 A | 1/1990 | Chan et al. | |
| 4,937,759 A | 6/1990 | Vold | |
| 4,973,215 A | 11/1990 | Karlen et al. | |
| 4,975,856 A | 12/1990 | Vold et al. | |
| 4,999,553 A | 3/1991 | Seraji | |
| 5,155,423 A | 10/1992 | Karlen et al. | |
| 5,160,239 A * | 11/1992 | Allen et al. | 414/699 |
| 5,224,033 A | 6/1993 | Nakamura et al. | |
| 5,257,177 A * | 10/1993 | Bach et al. | 700/61 |
| 5,294,873 A | 3/1994 | Seraji | |
| 5,341,289 A | 8/1994 | Lee | |
| 5,341,459 A | 8/1994 | Backes | |
| 5,363,304 A * | 11/1994 | Awano et al. | 701/50 |

(Continued)

OTHER PUBLICATIONS

Alami et al., "An Architecture for Autonomy," *The International Journal of Robotics Research*, vol. 17, No. 4, 40 pp. (Apr. 1998).

(Continued)

*Primary Examiner* — Jack Keith
*Assistant Examiner* — Jonathan M Dager
(74) *Attorney, Agent, or Firm* — Klarquist Sparkman, LLP

(57) ABSTRACT

Disclosed are an articulated hydraulic machine supporting, control system and control method for same. The articulated hydraulic machine has an end effector for performing useful work. The control system is capable of controlling the end effector for automated movement along a preselected trajectory. The control system has a position error correction system to correct discrepancies between an actual end effector trajectory and a desired end effector trajectory. The correction system can employ one or more absolute position signals provided by one or more acceleration sensors supported by one or more movable machine elements. Good trajectory positioning and repeatability can be obtained. A two-joystick controller system is enabled, which can in some cases facilitate the operator's task and enhance their work quality and productivity.

17 Claims, 6 Drawing Sheets

U.S. PATENT DOCUMENTS

| | | | |
|---|---|---|---|
| 5,390,104 | A | 2/1995 | Fulton |
| 5,404,661 | A * | 4/1995 | Sahm et al. ............... 37/348 |
| 5,408,767 | A * | 4/1995 | Hazama et al. ............. 37/396 |
| 5,430,643 | A | 7/1995 | Seraji |
| 5,446,981 | A * | 9/1995 | Kamada et al. ............. 37/348 |
| 5,528,843 | A * | 6/1996 | Rocke ....................... 37/348 |
| 5,550,953 | A | 8/1996 | Seraji |
| 5,581,166 | A | 12/1996 | Eismann et al. |
| 5,737,500 | A | 4/1998 | Seraji et al. |
| 5,767,648 | A * | 6/1998 | Morel et al. ............ 318/568.1 |
| 5,831,875 | A * | 11/1998 | Hirata et al. ................. 703/7 |
| 5,854,988 | A * | 12/1998 | Davidson et al. ............ 701/50 |
| 5,903,988 | A * | 5/1999 | Tochizawa et al. .......... 37/348 |
| 5,953,838 | A * | 9/1999 | Steenwyk .................... 37/348 |
| 5,968,104 | A * | 10/1999 | Egawa et al. ................ 701/50 |
| 6,047,227 | A * | 4/2000 | Henderson et al. .......... 701/50 |
| 6,061,617 | A * | 5/2000 | Berger et al. ................ 701/50 |
| 6,076,030 | A | 6/2000 | Rowe ........................ 701/50 |
| 6,140,787 | A * | 10/2000 | Lokhorst et al. ........ 318/568.18 |
| 6,144,910 | A * | 11/2000 | Scarlett et al. .............. 701/50 |
| 6,208,925 | B1 * | 3/2001 | Creger et al. ................ 701/51 |
| 6,211,471 | B1 * | 4/2001 | Rocke et al. ................ 177/136 |
| 6,233,511 | B1 * | 5/2001 | Berger et al. ................ 701/50 |
| 6,317,669 | B1 * | 11/2001 | Kurenuma et al. .......... 701/50 |
| 6,327,517 | B1 | 12/2001 | Sundar |
| 6,336,067 | B1 * | 1/2002 | Watanabe et al. ............ 701/50 |
| 6,609,315 | B1 * | 8/2003 | Hendron et al. ............. 37/348 |
| 6,655,465 | B2 * | 12/2003 | Carlson et al. .............. 172/4.5 |
| 6,691,437 | B1 * | 2/2004 | Yost et al. ................... 37/348 |
| 6,826,450 | B2 * | 11/2004 | Watanabe et al. ........... 700/245 |
| 6,891,526 | B2 | 5/2005 | Gombert et al. |
| 6,898,502 | B2 * | 5/2005 | Watanabe et al. ............ 701/50 |
| 6,968,264 | B2 * | 11/2005 | Cripps ........................ 701/50 |
| 7,010,367 | B2 * | 3/2006 | Koch et al. .................. 700/85 |
| 7,114,430 | B2 * | 10/2006 | Reedy et al. ................. 91/392 |
| 7,139,662 | B2 * | 11/2006 | Ericsson et al. ............. 701/207 |
| 7,295,891 | B2 * | 11/2007 | Huttenhofer et al. ........ 700/245 |
| 7,457,698 | B2 | 11/2008 | Danko |
| 7,797,860 | B2 * | 9/2010 | Schoenmaker et al. ....... 37/348 |
| 7,853,356 | B2 * | 12/2010 | Tsai et al. .................... 700/245 |
| 2003/0001751 | A1 * | 1/2003 | Ogura et al. ................ 340/691.6 |
| 2004/0267404 | A1 * | 12/2004 | Danko ........................ 700/245 |
| 2005/0004734 | A1 * | 1/2005 | Cripps ........................ 701/50 |
| 2005/0049838 | A1 * | 3/2005 | Danko ........................ 703/2 |
| 2006/0245896 | A1 * | 11/2006 | Alshaer et al. ............... 414/685 |
| 2007/0255454 | A1 | 11/2007 | Dariush |
| 2009/0099738 | A1 | 4/2009 | Danko |

OTHER PUBLICATIONS

Brooks, "Model-Based Three-Directional Interpretations of Two-Dimensional Images," *IEEE Transactions on Pattern Analysis and Machine Intelligence*, vol. PAMI-5, No. 2, pp. 140-150 (Mar. 1983).

Danko et al., "Model-based camera vision evaluation of mining machine motion," 32nd Intl Symp. of the Application of Computers and Operations Research in the Mineral Industry, pp. 513-520 (Mar. 2005).

Danko, "Operator Control Architecture," *4th Regional Symp. On Computer Applications in the Minerals Industries*, 15 pp. (Sep. 2001).

Goodzeit et al., "System and Periodic Disturbance Identification for Feedforward-Feedback Control of Flexible Spacecraft," Proc. of the 35th AIAA Aerospace Science meeting and Exhibit, 17 pp. (Jan. 1997).

International Search Report for PCT US02/27860 dated Feb. 26, 2003, 1 page.

Juang et al., "Identification of System, Observer, and Controller from Closed-loop Experimental Data," *Journal of Guidance, Control, and Dynamics*, vol. 17, No. 2 pp. 9196 (Jan.-Feb. 1994).

Kalman et al., "A New Approach to Linear Filtering and Prediction Problems," *Transactions of the ASME—Journal of Basic Engineering*, vol. 82 (Series D), pp. 35-45 (1960).

Kogler et al., "Further approaches in automation on roadheaders/bolter miners in production and development," *Fourth Intl Symp. on Mine Mechanization and Automation*, pp. A6-11 through A6-18 (1997).

Lu et al. "Fast and Globally Convergent Pose Estimation from Video Images," *IEEE Transactions on Pattern Analysis and Machine Intelligence*, vol. 22, No. 6, pp. 610-622 (Jun. 2000).

Phan et al., "Improvement of Observer/Kalman Filter Identification (OKID) by Residual Whitening," Journal of Vibrations and Acoustics, vol. 117, pp. 232-239 (Apr. 1995).

Phan et al., "Markov Parameters in System Identification: Old and New Concepts," *Structronic Systems: Smart Structures, Devices, and Systems*, vol. 2, pp. 263-293 (1997).

Phan et al., "Unifying Input-Output and State-Space Perspectives of Predictive Control," Princeton University, Dept. of Mechanical and Aerospace Engineering Technical Report No. 3044, 35 pp. (Sep. 1998).

Roberts et al., "Automation of Underground Truck Haulage," *Intl Symp. on Mine Mechanisation and Automation*, pp. B5-23 through B5-32 (Jul. 1997).

Shafiq et al., "Marker detection and trajectory generation algorithms for a multicamera based gait analysis system," *Mechatronics*, vol. 11, pp. 409-437 (2001).

Stentz et al., "A Robotic Excavator for Autonomous Truck Loading," *Autonomous Robots*, vol. 7, No. 2, pp. 175-186 (Sep. 1999).

Craig, *Introduction to Robotics: Mechanics and Control*, Table of Contents, Ch. 3, "Manipulator Kinematics," Ch. 4, "Inverse Manipular Kinematics," Ch. 5, "Jacobians: Velocities and Static Forces," and Ch. 6, "Manipulator Dynamics," 142 pp. (1989).

Danko, source code listings and other materials associated with graduate course entitled, "Introduction to Robotics," taught at the University of Technology, Helsinki, Finland, 81 pp. (2000).

Schetzen, *The Volterra and Wiener Theories of Nonlinear Systems*, Table of Contents, Ch. 2, "First-Order (Linear) Systems," and Ch. 15, "Nonlinear System Identification," 60 pp. (1980).

Walters, *Hydraulic and Electric-Hydraulic Control Systems*, Table of Contents, Ch. 8, "Control Systems," Ch. 12, "System Analysis of Electro-hydraulic Control Systems," Ch. 16, "Further Case Studies," Ch. 21, "System Enhancement," and Ch. 27, "Steady-State System Analysis," 76 pp.(2000).

* cited by examiner

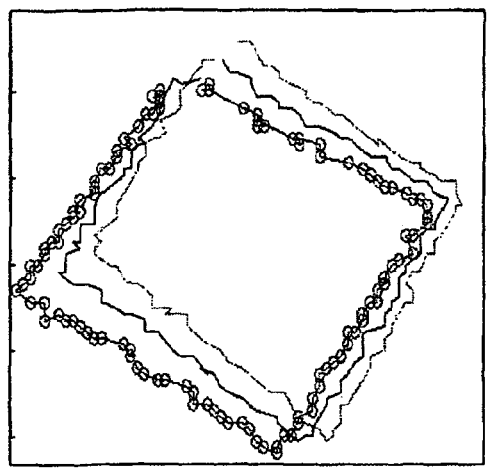 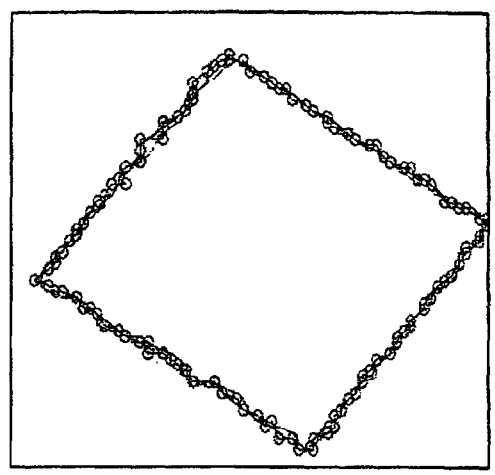
Figure 5
PRIOR ART
Figure 6

US 8,065,060 B2

COORDINATED JOINT MOTION CONTROL SYSTEM WITH POSITION ERROR CORRECTION

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DE-FC26-04NT42087 awarded by the Department of Energy.

FIELD OF THE INVENTION

The present invention relates to a computerized control system for controlling hydraulic machinery of the type having an articulated arm carrying an end effector or tool at its extremity The invention is particularly, although not exclusively, applicable to control of coordinated joint systems, for example as employed in excavating equipment and certain three-dimensional image generators such as anatomic simulators. One non-limiting example of a machine that can benefit from the control systems and methods of the invention is a power shovel having an articulated arm supported from a rotatable turret and carrying a shovel or bucket at its extremity.

BACKGROUND OF THE INVENTION

Computer-assisted operator control of hydraulic machinery requires stable, smooth machine response. Danko U.S. patent application Ser. No. 10/488,011, Publication No. 20040267404, "referenced Danko '404" hereinafter, entitled "Coordinated joint motion control system", the entire disclosure of which application is hereby incorporated herein by reference thereto, discloses a coordinated joint motion control system for hydraulic machinery and the like. The disclosed control system employs a software-based kinematics reconfiguration system to assist the operator with various tasks. Danko '404's disclosure includes a differential, forward-prediction kinematics solution for adjusting the as-built machine hardware kinematics to an as-desired kinematics which provides desirable, reference actuator velocities and can yield a resultant motion trajectory that is well suited for the task specified. The systems and methods disclosed in Danko '404 are believed useful for their intended purposes, but, as is understood by the present invention they may not address the question of how to compensate for imperfect control system components.

Implementation of kinematics transformation from a virtual model in the digital domain to a real world tool trajectory is a difficult task because of the reliance on imperfect mechanical sensors and actuators. Energy loss reduction is a significant consideration for heavy equipment, mobile hydraulics control systems for excavators and the like may need to employ simplified control loops having higher energy efficiencies than do other control systems, for example hydraulic robot control systems. However, response time and precision may be compromised in such simplified hydraulic control loops. Generally, it is to be expected that the load-dependent valve and hydraulics control response characteristics will be non-linear. What are known as "measured valves" have been proposed to linearize the control valves and eliminate load-dependency by applying closed control loops around the valves. In Danko '404 a drawback of this approach, is that the hydraulic circuit may not effectively and timely apply the desired control velocity to the machine elements or links, owing to hydraulic flow inertia or pressure deficiencies that may arise.

Pursuant to the present invention it can be understood that it would be desirable to have accurate position information regarding the moving machine elements and especially regarding the end effector or tool. Further, it is an understanding of the invention that such position information for a given point in time and provided continuously throughout machine operation could be useful in enhancing control system performance.

A number of solutions have been proposed to the general problem of system identification i.e. determination of a system space-state at a given point in time from a noisy observation signal. For example Kalman, R. E., in "A New Approach to Linear Filtering and Prediction Problems," *Journal of Basic Engineering*, 82 (Series D), 1960, pp. 35-45, describes an iterative method for developing a state-space system model during the solution. Various methods for identifying a causal linear or non-linear system are given by Schetzen, M., *The Volterra and Wiener Theories of Nonlinear Systems*, John Wiley and Sons, 1980, including convolution and Volterra series-based solutions.

Hypothetically, it might be possible to construct a priori a multi-variable, nonlinear machine model, at least for an unloaded machine, that could predict the motion of the machine under arbitrary control of all actuators. A non-iterative, Volterra-series, linear or non-linear, multi-variate system identification method could be applied. A drawback of such methods is that they may be computationally too extensive to be effectively used in embedded real-time control applications, where model computation time is significantly limited. A priori system model developments are described by Juang, J. -N. and Phan, M. in "Identification of System, Observer, and Controller from Closed-loop Experimental Data," *Journal of Guidance, Control, and Dynamics*, Vol. 17, No. 2, January-February 1994, pp. 91-96. and by Phan et al. in "Improvement of Observer/Kalman Filter Identification (OKID) by Residual Whitening," *Journal of Vibrations and Acoustics*, Vol. 117, April 1995, pp. 223-238. An observer-controller identification method from measurements under closed-loop control is given by Juang and Phan [1994]. A state-space dynamic system model identification from measured input-output data processed first as observer Markov parameters is described by Phan et al., "Markov Parameters in System Identification: Old and New Concepts," *Structronic Systems: Smart Structures, Devices, and Systems*, Vol. 2, Tzou, H. S. and Guran A. (eds.), World Scientific, Singapore, 1997, pp. 263-293.

A direct, adaptive system identification approach is described by Phan et al. in "Unifying Input-Output and State-Space Perspectives of Predictive Control," *Department of Mechanical and Aerospace Engineering Technical Report No.* 3044, Princeton University, September, 1998 for predictive control of a flexible and lightly damped system with complex dynamics. Such an adaptive/predictive state-space control system component may be identified in the presence of unknown disturbances from measurements, as demonstrated by Goodzeit, N. E. and Phan, M. Q. in "System and Periodic Disturbance Identification for Feedforward-Feedback Control of Flexible Spacecraft," *Proceedings of the 35th AIAA Aerospace Science Meeting and Exhibit*, Reno, Nev., January 1997. Goodzeit N. E. and Phan point to advantages that may be obtained by simplifying a control compensation task by excluding responses to selected disturbances. Such methods can avoid the saturation of the adaptive control system with too many disturbance-corrupted signals and can be described as "clear-box" adaptive control methods. However, none of these proposals is entirely adequate to compensate for the mechanical inefficiencies that may arise in articulated hydraulic machinery under time- and task-variable, external loads.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

BRIEF SUMMARY OF THE INVENTION

In one aspect the invention provides an articulated hydraulic machine supporting an end effector for performing useful work, the articulated hydraulic machine comprising a control system capable of controlling the end effector for automated movement along a preselected trajectory. Beneficially, the control system comprises a position error correction system to correct discrepancies between an actual end effector trajectory and a desired end effector trajectory. The error correction module can:
 a) compares the actual end effector position at a given point in time with a reference position appropriate for the desired end effector trajectory;
 b) generates a difference between the actual end effector position and the reference position; and
 c) applies a correction signal to the machine to reduce the difference.

Various useful features can be employed in practicing the invention to facilitate the achievement of one or more of its objectives. For example, the reference position can be modeled for a hypothetical model machine under identical control command to that of the real machine, save for the corrections. The control system can comprise two operational parts respectively capable of separately processing a reference position vector and an actual position vector and these may be connected using a closing control loop which compares the actual position vector with the reference position vector and generates the correction signal.

In one embodiment, the machine provides to the control system absolute position information regarding at least one movable machine element to facilitate determination of the end effector position. The machine can have multiple movable machine components contributing to movement of the end effector and the absolute position information can comprise absolute position information regarding each movable machine element. The position error correction system can comprise one or more of a joint control model, a machine actuators model and a dynamic machine model. If desired, the position error correction system can be effective to correct velocity error.

The machine can include one or more acceleration sensors, each supported by a movable machine element to provide absolute position signals to the control system regarding the respective machine element. If desired, an accelerometer can be provided at or on each movable machine element that contributes to end effector positioning.

In a further embodiment, the control system employs model-based forward prediction to predict a next movement of a machine element and scale the predicted movement to provide desired movement. The control system can apply the correction signal kinematically, providing continual incremental adjustments while the machine is moving to execute a specified end effector trajectory.

The machine can be a mining machine, a construction machine, an excavator, a front loader a mechanical shovel or other machine capable of benefiting from the novel control system described herein. In general, the invention can be utilizes with machines employing operator-directed repetitive motion of an articulated limb. Such machines may be intended for any of a wide variety of uses including industrial, domestic and personal uses.

The invention also provides a control system for a machine as described, which control system comprises a position error correction module to correct discrepancies between the actual end effector trajectory and the desired end effector trajectory. The error correction module can compare the actual end effector position at a given point in time with a reference position appropriate for the desired end effector trajectory. Also, the error correction module can generate a difference signal indicating a difference between the actual end effector position and the reference position and can apply a correction signal to the machine to reduce the difference.

In another aspect the invention provides a method of controlling a machine such as is described above. The method can comprise prescribing a desired tool or end effector position to the controlled machine, comparing one or more reference positions appropriate for achieving the desired tool position with one or more actual machine element positions determined from an absolute sensor signal, generating a correction and applying the correction to improve the actual position.

The present invention recognizes, inter alia, that benefits can be obtained by providing error compensation in the execution of the reference velocities and trajectory in the methods of Danko '404, and provides an embedded, dynamic model that can be applied for this task.

The control systems and methods of some embodiments of the invention enable the automated generation of useful working tool trajectories by articulated hydraulic machines and the like with considerable precision and repeatability. Such novel control systems can relieve an operator of a number of tedious, repetitive control functions permitting the operator to concentrate on overall machine positioning, trajectory selection and fine-tuning or trimming of tool action, and other concomitant functions.

The novel systems and methods of the invention enable the achievement of precise control with good absolute spatial positioning and good motion trajectory, as well as accurate repeatability by means of the application of correction feedback techniques. Danko '404 refers to correcting or linearizing individual control elements independently. More general correction with fewer independent correction feedback component loops is desirable and attainable in embodiments of the present invention.

Furthermore, the invention contemplates providing additional sensory inputs from absolute, as opposed to relative, link positions to facilitate adaptive control error compensation. Pursuant to clear box concepts, other signal errors, regarded as not consequential, may be tolerated by design.

BRIEF DESCRIPTION OF THE SEVERAL VIEWS OF THE DRAWING

Some embodiments of the invention, and of making and using the invention, as well as the best mode contemplated of carrying out the invention, are described in detail below, by way of example, with reference to the accompanying drawings, in which like reference characters designate like elements throughout the several views, and in which:

FIG. 5 is a side elevation of the trajectory of a small component of the end effector of the shovel shown in FIG. 1, with imperfect and uncompensated motion control values, as it might appear when operated by a known control architecture such as that shown in FIG. 3;

FIG. 6 is a side elevation of the trajectory of a small component of the end effector of the shovel shown in FIG. 1, with imperfect and uncompensated motion control values, as it might appear when operated by a control architecture according to an embodiment of the present invention, such as that shown in FIG. 4;

DETAILED DESCRIPTION OF THE INVENTION

Figure 1:
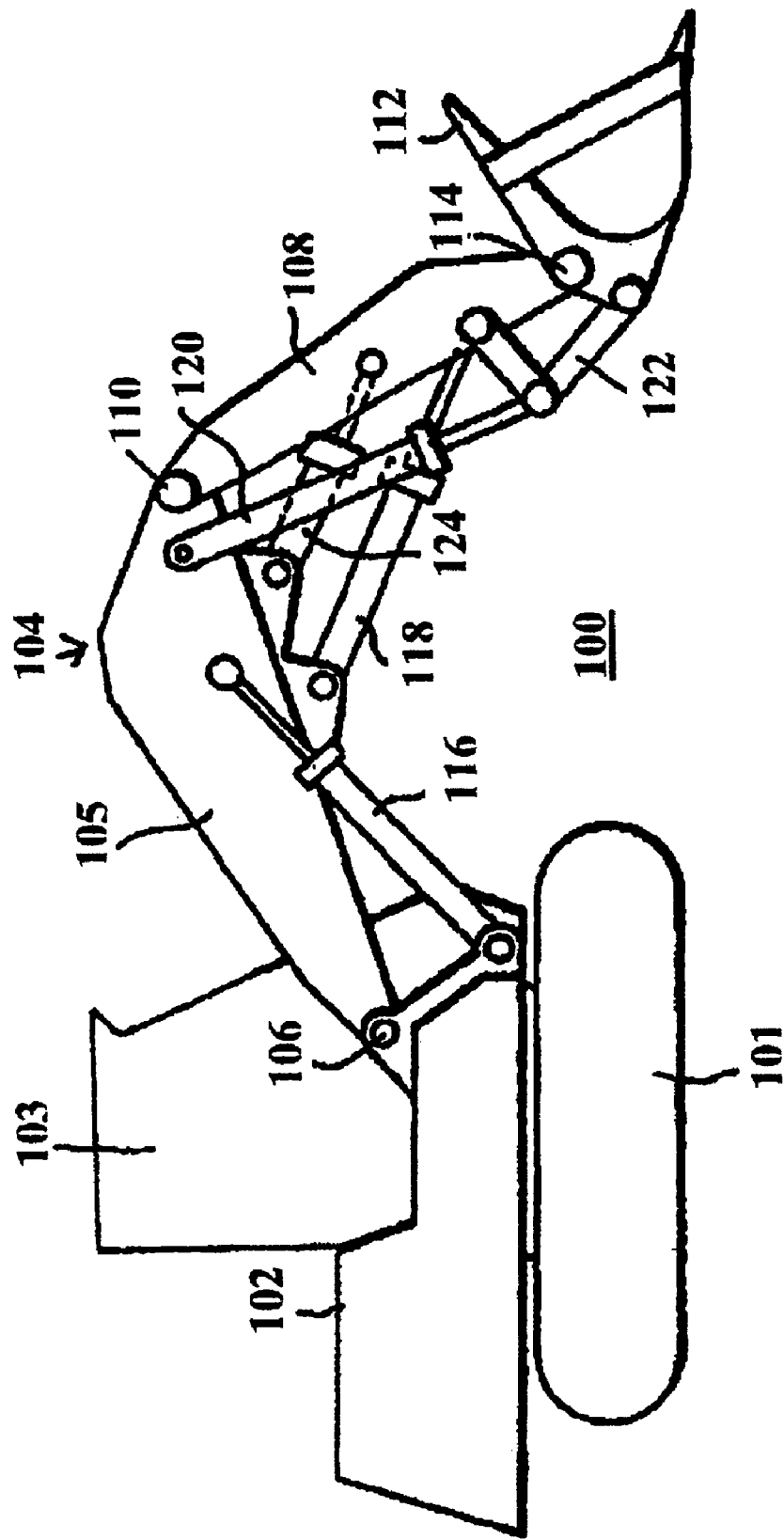
FIG. 1 is a schematic side elevation of a known articulated hydraulic machine, in this case a powered shovel, which machine is suitable for being controlled by a coordinated joint motion control system according to the present invention.

To provide an enhanced control system for articulated hydraulic machines such as power shovels and excavators, the invention uses a simple, approximate, dynamic machine model useful for real-time control applications. Some embodiments of the novel control system of the invention provide a simple predictive control with embedded system identification. The system identification can provide real-time identification of actual positions of movable elements of the machine at given points in time. The technique does not require pre-calibration or a priori model formulation, although such methods may be employed, if desired.

The invention is particularly, although not exclusively, applicable to controlling an articulated hydraulic machine comprising a coordinated joint motion system which coordinated joint motion system includes: a support; multiple links; multiple joints, optionally revolute or prismatic joints, connecting the links one to another and to a support, each joint permitting relative movement between the connected members; multiple actuators to effect the relative movement between the connected members, the multiple actuators being controlled by the coordinate joint control system; and an end effector supported by the jointed links for movement relative to the support.

Usefully, in such an exemplary application, the coordinated joint motion system can be capable of execution of an automated end effector trajectory without human intervention. Also, if desired, the coordinated joint control system can comprise an operator interface enabling a human supervisor to change the end effector motion or position during execution of the automated trajectory.

The machine's control system can comprise an internal feedback loop to determine a mathematical model of the coordinated joint motion system and provide a model-based forward predictor for directly controlling the joint actuators, optionally by employing a differential control architecture.

In one inventive embodiment, the dynamic machine model is used in a differential control architecture in which the motion kinematics of the machine is software controlled. The control method retains the advantages of the differential kinematics transformation with which continuous operator control is provided, such as is disclosed and claimed by Danko '404, by controlling transformed actuator velocities. At the same time, in this embodiment of the invention, closed-loop position control can provide for the cancellation of motion error caused by machine inertia, control system-component imperfections, repeatability and other errors.

The dynamic machine model can be continuously updated during motion, providing for adjustments to model errors caused by the approximations inherent in the modeling process. Some of these approximations may include: the replacement of the true cross-effects between machine links with time dependent adjustments; time-averaging of the model coefficients; the treatment of non-linearity; and approximate solution techniques.

One useful embodiment of the model space-state identification process applies least square fit between modeled and measured link positions, resulting in a natural depression of measurement noise. This simple technique does not require any pre-assumption about noise statistics.

Referring to FIG. 1, the powered shovel shown, to which the control systems and methods of the invention can be applied, which in this case is a front end shovel loader, comprises a tracked motive under carrier or ground-engaging system 101 supporting a variable-slew rotatable turret 102. Rotatable turret 102 has a cab 103 to house a human supervisory operator and supports one end of an articulated positioning unit 104 for manipulating a tool or other end effector supported at the other end of positioning unit 104.

Positioning unit 104 comprises a boom 105 articulated to turret 102 for rotation about a pivot 106, thereby providing a boom joint. Positioning unit 104 further comprises a lever arm 108 one end of which is articulated to boom 105 for rotation about a pivot 110, thereby providing an arm joint. The other end of lever arm 108 is articulated to and supports a tool, in this case a shovel or bucket 112, for rotation about a bucket pin 114, thereby providing a tool joint. The described rotations are to be understood as all being about axes perpendicular to the plane of the paper. While the example illustrated in the drawings comprises revolute joints having one or multiple degrees of freedom, other joints may be utilized, for example prismatic joints.

The tilt or orientation of shovel 112 is preferably also variable, for which purpose shovel 112 can be mounted with two further degrees of rotational freedom about axes in the plane of the paper by means (not shown). Such further shovel rotational means may comprise, for example, a first pivotal attachment to the distal end of arm 108 providing rotation about a longitudinal arm axis extending through pivots 110 and 114 and a second axis perpendicular thereto, also extending through bucket pin 114.

Piston-and-cylinder hydraulic actuators 116, 118 and 120 control the motion and position of boom 105, arm 108 and shovel or bucket 112, respectively. Each actuator 116-120 is pivotally secured at its ends and cylinder 120 is connected to shovel 112 through an articulated link 122 to enhance its leverage. One or more leveling, guide or ancillary cylinders such as leveling cylinder 124 may be provided if desired, but may be rendered unnecessary by the software kinematics configuration capabilities of the present invention.

Figure 2:
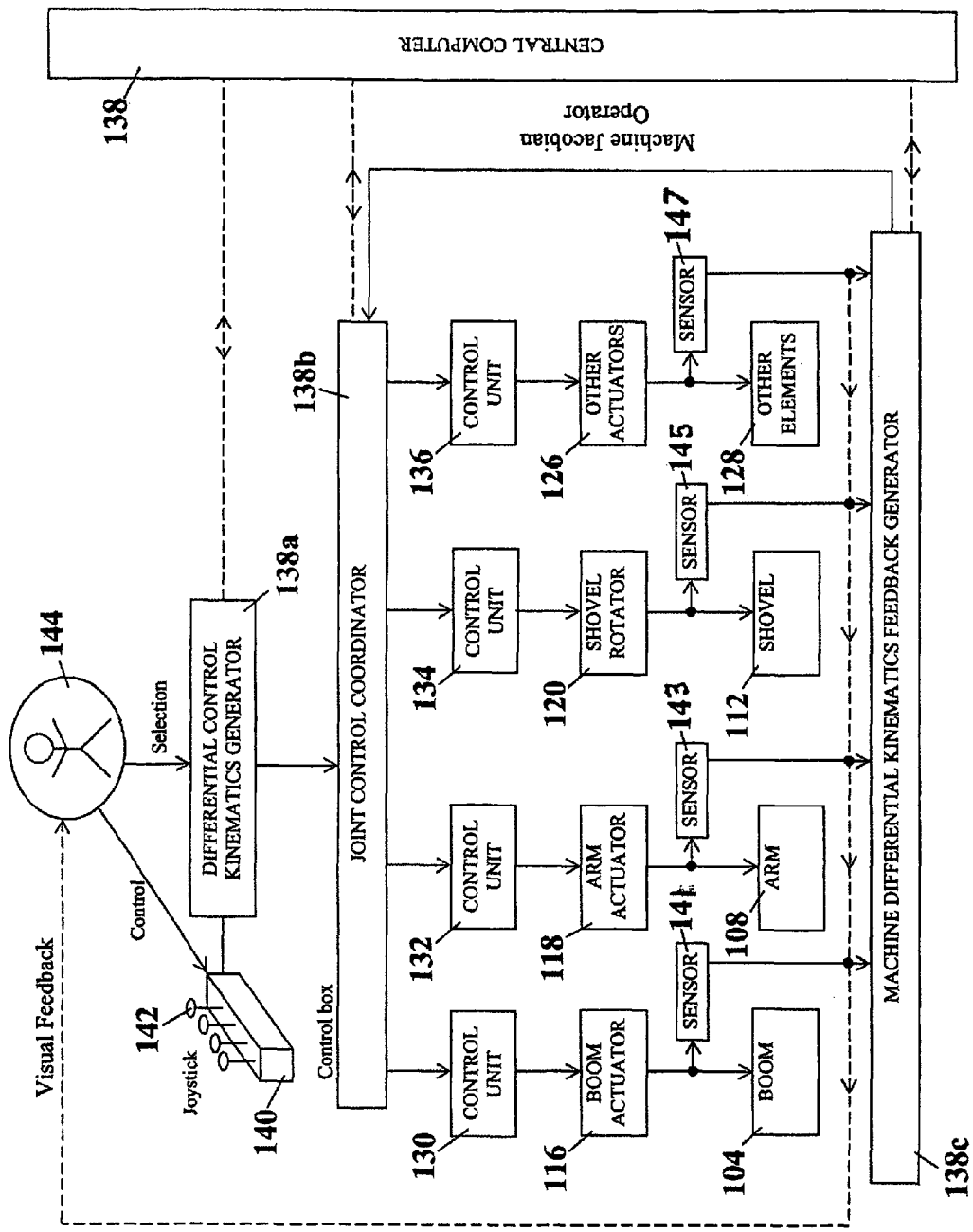
FIG. 2 is a schematic view of a known motion control system such as is disclosed in Danko '404 which is useful for controlling the powered shovel shown in FIG. 1.

Referring to FIG. 2, other actuators such as 126 can optionally also be provided for moving and positioning other elements or systems, for example turret 102, and ground-engaging system 101, as will be further described hereinbelow.

In the motion control system illustrated in FIG. 2, each actuator 116-120 and 126 is operated by its own, local hydraulic control unit 130-136, respectively, which control unit receives a signal from a joint control coordinator 138*b* and controls its associated actuator 116, 118, 120 or 126 to provide a suitable output. One example of a suitable output comprises a desired position and/or velocity of the associated articulated element 104, 108, 112 or 128. This output is determined by the joint control coordinator 138*b* based on the forward input from the differential control kinematics generator 138*a* and the feedback input from the machine differential kinematics feedback generator 138*c*.

Each articulated element 104, 108, 112 or 128 is provided with a transducer sensor 141, 143, 145 or 147, respectively, to detect preferably at least the position of the respective articulated element 104, 108, 112 or 128 with respect to its supporting element, and report the sensed position, preferably as a continuous or time-divided signal, to the machine differential kinematics feedback generator 138*c*.

A control box 140 comprises a suitable number of manually operable control members or joysticks 142 which can be moved, pressured or otherwise manipulated by a human supervisor 144 to move the boom 104 and/or arm 108 and/or shovel 112, and/or other elements, according to a desired trajectory. Joysticks 142 may be the same or different and may comprise any convenient and suitable manually operable input member such as a pivotable lever, wheel, slide, key, button or set of keys or buttons or comprise a pointing device such as a mouse, trackball or the like. In mining and construction industries, pivoted levers are common. Conventional powered shovels and other such articulated hydraulic machinery employ at least one joystick for each powered joint. This number may be varied, as will become apparent hereinbelow. Additional joysticks may be provided for operation of rotatable turret 102 and, possibly also for the drive to ground-engaging system 101 to move the powered shovel around, or to or from a work site, or for other desired purposes.

The signal outputs from control box 140 are supplied to the differential control kinematics generator 138*a* that is provided with suitable data storage means, such as a hard drive, optical drive, flash memory and the like. Suitable software and/or programs, for implementing the control processes may be stored on such data storage means, or may be remotely accessed by central computer 138.

Preferably, but optionally, the differential control kinematics generator 138*a* is also provided with conventional input/output devices such as mouse, keyboard, touch pad or touch screen, monitor, printer data transfer means such as radio wave input/output, removable data storage media, and so on, enabling human supervisor 144 to interface with the unit and mediate the operation of, for example, positioning unit 104, if desired. Such mediation or intervention by human supervisor 144 enables supervisor 144 to change the response of the control system to one or more inputs received by control box 140 to modify a programmed response or to choose a desired response from multiple possible preprogrammed responses, as will be further described hereinbelow.

The differential control kinematics generator 138*a*, joint control coordinator 138*b*, and machine differential kinematics feedback generator 138*c* are preferably realized in a common central computer 138.

Preferably also, the central computer 138 provides a visual display which can include schematic representations of the real machine's configuration and virtual machine configurations that can be employed by human supervisor 144. In addition, calculated and learned trajectories can be made available for selection by human supervisor 144. Optionally also, machine 100 may be equipped with cameras providing one or more views of the tool and the work area, which views can be displayed by the computer, and optionally integrated with the control programs to enhance the control system.

Figure 3:
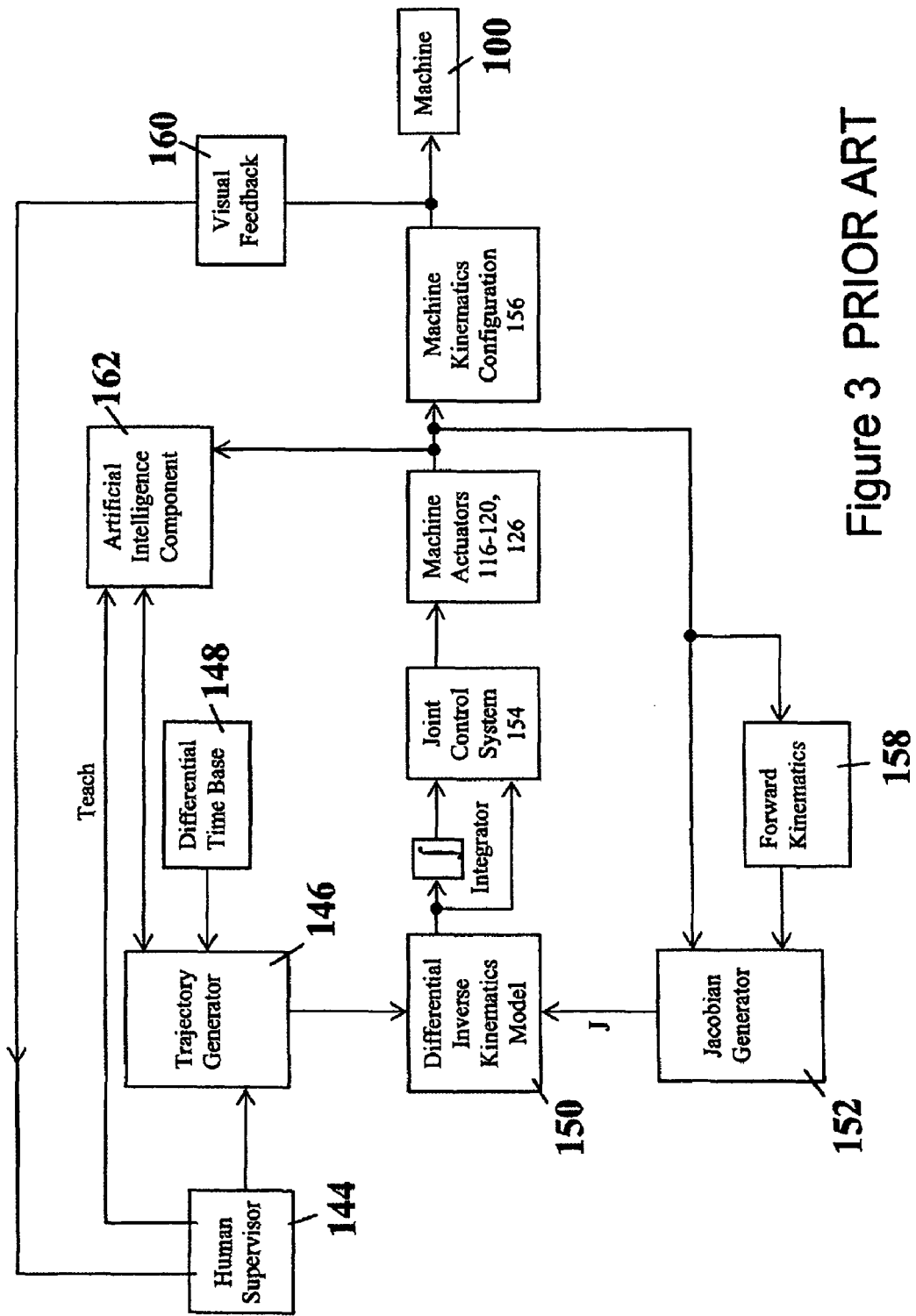
FIG. 3 is a block flow diagram of a continuous differential control architecture according to Danko '404 for operating the motion control system illustrated in FIG. 2.

Referring to FIGS. 2-3, employing the control architecture illustrated in FIG. 3, human supervisor 144 uses computer 138 to input, or select, a predetermined shovel trajectory for processing by trajectory generator 146. Trajectory generator 146 employs a differential time base 148 to generate a differential trajectory with transformation which outputs to differential inverse kinematics model 150 which is generated based on a Jacobian generator 152. Differential inverse kinematics model 150 provides a value, series of values or continuous signal for each machine joint to be moved. This may for example be the double differential with respect to time of the particular joint angle $\theta$.

Employing an integrator 153, a matrix of angular acceleration and velocity signals for each joint to be moved is applied to the joint control system 154 in FIG. 3. Joint control system 154 can comprise relevant processing components of central computer 138 and control units 130-136. Operation of control units 130-136 imparts suitable positioning and velocity to actuators 116-120 and 126, thereby providing a desired machine kinematics configuration 156 to the machine 100.

Sensors 141, 143, 145 and 147 read the positions, and optionally the velocities, of actuators 116-120 and 126 which values or signals are applied to Jacobian generator 152 both directly and after forward kinematics processing 158.

Human supervisor 144 observes the machine, notably the performance of the end effector, in this case, shovel 112, and also the configuration of the boom 105 and the articulated arm 108. If desired, supervisor 144 can employ visual feedback 160 to control trajectory generator 146, or to apply tool trajectory adjustments using joysticks 142 or to select a different or modified trajectory using central computer 138.

An optional artificial intelligence component 162, receiving input from machine actuators 116-120, 126 and human supervisor 144, can be used to provide to trajectory generator 146 a desirable or optimum trajectory family for typical, repetitive tasks.

As used herein, the term "trajectory" is to be understood to include reference to a series of motion coordinates of an end effector, e.g. a tool or shovel 112, which represent a number of consecutive motion positions or a locus of the motion of the end effector within a time frame. Also, as used herein, the term "machine kinematics" is to be understood to include reference to the relationship between the actuators' positions or movements and the end effector's position or movement;

As described above, the signal generated by an individual joystick 142 can be distributed to more than one actuator 116-120 and 126. Preferably, the distribution of the joystick control is accomplished dynamically, while the system is in motion, using a pre-programmed trajectory family, or pre-defined coordinate system, or a pre-defined control kinematics.

Employing the control architecture disclosed in Danko '404, it is possible to provide efficient control of coordinated joint motion without generating an integrated path in the control computer model-space and then differentiating the trajectory for joint variable control during real-time machine control. Thus, the control system illustrated in FIG. 3 employing differentiating control architecture, does not require the use of closed joint position control loops. Instead, a main, Cartesian position control loop is, in this embodiment, applied to each motion component through visual feedback from the human supervisor 144.

Although not an inherent or required component for the purpose of kinematics re-configuration in the control architecture, position feedback loops may optionally be employed for linearization, backlash compensation and/or to achieve added stability. Such optional feedback loop in each control element may be useful for achieving acceptable control performances when imperfect machine elements are employed. The present invention describes one example of an overall, closed feedback control loop for each link that comprises many individual control elements. Others will be apparent to those skilled in the art in the light of this disclosure.

While recognizing that modified control architectures based upon other control parameters would be, or become, apparent to those skilled in the art, Danko '404 discloses that a particularly useful position-control signal is control velocity. This is a common example characteristic of hydraulic power machinery. Using velocity control, applied by joysticks 142, the human supervisor 144 can adjust and correct the tool position. An internal feedback loop is applied via sensors 140-146, forward kinematics 158 and Jacobian generator 152 to generate differential inverse kinematics model 150 of the machine configuration for a given tool position. In other words, for a given tool position, a kinematic model is generated of how the machine should be configured, which model specifies parameters such as the angular position and velocity of each joint. As disclosed, the model can be, but is not limited to, an inverse, or pseudo inverse, Jacobian, a sensitivity matrix that relates the joint-space θ variables as a vector, to an input vector of Cartesian variables $x_i$.

Figure 4:
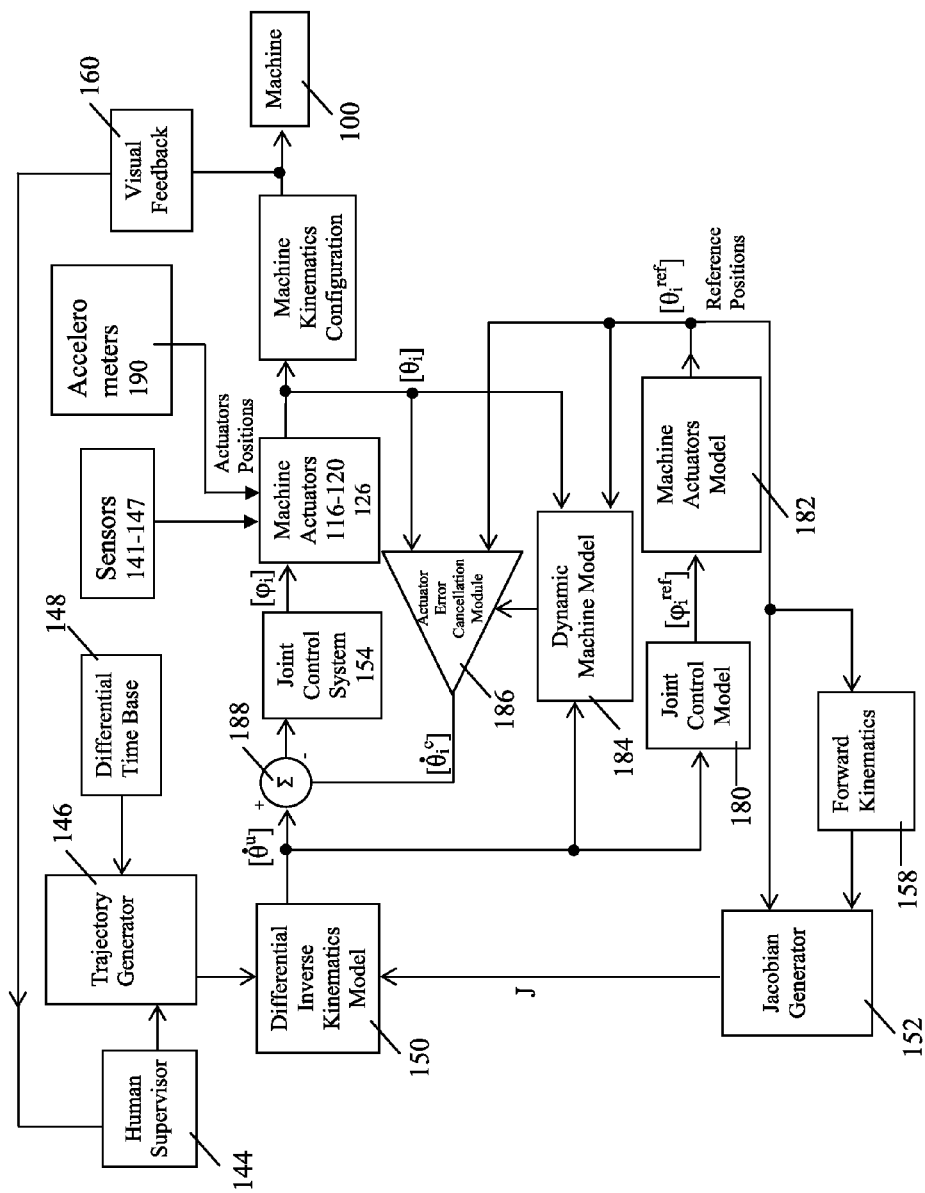
FIG. 4 is a block flow diagram of a differential control architecture including dynamic machine modeling for position error correction according to one embodiment of the present invention, which control architecture is also useful for operating the motion control system illustrated in FIG. 2.

Referring now to FIG. 4, the embodiment of inventive control architecture there shown is intended to be useful for enhancing or correcting the differential control of a complex system for operating hydraulic machinery that includes imperfect hydraulic valves, actuators, and machine links which have inertia and mechanical inefficiencies causing control response delays and other disturbances.

In FIG. 4: "$[\theta_i^{ref}]$" is used to denote the modeled reference positions or position vector; "$[\theta_i]$" is used to denote the actual positions or position vector of the real machine; "$[\dot{\theta}_i^u]$" denotes a differential control signal vector of velocities; "$[\dot{\theta}_i^c]$" denotes a correction signal vector of velocities; "$[\phi_i^{ref}]$" denotes a reference actuator velocity control signal of voltages; and "$[\phi_i]$" denotes real machine actuator control signal of voltages.

The present invention provides control system embodiments wherein system processing architecture such as that illustrated in FIGS. 1-3, is split or cut open into two parts to separately process reference position signals and real time position signals. The split signals can be processed to generate an adjustment or correction for the control system which will better move the end effector on a desired trajectory, and can then be reconnected.

Unlike Danko '404, the illustrated embodiment of the present invention provides means to communicate to the control system what may be termed "absolute" position information regarding the movable machine elements or links, as is further described hereinbelow, enabling the end effector position at any given moment to be accurately determined. Typical embodiments of the Danko '404 disclosure employ relative position sensors whose output is not suitable for clear identification in an absolute, ground-related coordinate system of the end effector position at any given moment.

Whereas known systems may be based upon an expectation that the machine will do what it was directed to do, i.e. that the machine will more or less faithfully execute a trajectory supplied to the control system, in practice, mechanical imperfections and inertia in the actuators and components of articulated positioning unit 104, may result in significant variances from the desired trajectory. In one aspect, a control system according to the present invention generates a reference model, which may be a continuously updated model, of what the machine should be doing, and which senses what the machine is actually doing and provides corrections to move the machine toward the model. An example is described herein of the generation of a dynamic, continuously updated, causal system model used for determining the error correction signal.

In a method known from Danko '404, the control system employs model-based forward prediction wherein a next movement of a machine component is predicted and scaled to provide desired movement. Velocity-based control is employed with the expectation that machine components will accurately follow instructions applied to the actuators, possibly with the assistance of embedded, independent correction feedback loops for each component.

In contrast, the present invention provides, in some embodiments, robust error detection obtained by "looking at" or system-determining the actual or absolute positions of the end effector and the machine links. Desirably, the position of each machine link or element that contributes to movement of the end effector is determined. The control system can be responsive to one or more of the actual positions.

One method embodiment of the present invention comprises prescribing a desired tool or end effector position to the controlled machine, comparing one or more reference positions appropriate for achieving the desired tool position with one or more actual machine element positions determined from an absolute sensor signal, generating a correction and applying the correction to improve the actual position.

In an embodiment of the inventive control architecture, corrections or adjustments are effected kinematically, providing continual incremental adjustments while the machine is moving to execute a specified end effector trajectory. For example, the adjustments, or corrections, can be made at system-determined timed intervals. The length of the time intervals may be selected in accordance with the precision and frequency of position signals output from sensors 141, 143, 145 and 147, the response times of the hydraulic and mechanical machine components, for example, actuators 116-120, 126, components 105-114 and system processing capabilities. In one example, which is further described herein the system processing time interval for determining the causal, dynamic system model is 60 ms. Other appropriate considerations can also, or alternatively, be employed to determine system processing intervals. During the system processing time interval, samples of the measured position of each link with time are taken. The resulting time series of samples is evaluated by least square fitting to them a second-order, dynamic motion model, i.e., a differential equation with constant coefficients. The constant coefficients are then used to represent the dynamic machine model for each link.

Broadly stated, kinematic control correction can be provided, in accordance with the invention, by determining the actual positions of a hydraulic machine's, or comparable machine's actuators, at a given point in time and comparing those actual actuator positions with reference positions modeled for a hypothetical model machine. The hypothetical model machine is under differential coordinated joint motion control, according to Danko '404. In practicing the present invention, control can be identical to that of the real machine, save for the corrections.

In another embodiment of the invention, an objective of the control correction task is to reduce, minimize or eliminate the difference between $[\theta_i^{ref}]$ and $[\theta_i]$. Other embodiments of the invention can employ different relationships between $[\theta_i^{ref}]$ and $[\theta_i]$ to obtain other desired objectives. For example, it may be desired to adjust $[\theta_i]$ to obtain a constant or predictably variable relationship to $[\theta_i^{ref}]$.

Pursuant to the aforementioned embodiment of the invention, a useful reduction, minimization or elimination of the difference between $[\theta_i^{ref}]$ and $[\theta_i]$ can be accomplished by using negative feedback methodology. To this end, the actual link position vector $[\theta_i]$ can be separated from the reference position vector $[\theta_i^{ref}]$ vector, which is provided as an output signal from suitable system control architecture such as the differential control architecture disclosed and claimed in Danko '404. Danko '404 discloses the use of transducer sensors 140-146 to detect the positions of articulated elements 104, 108, 112 and 128 with respect to their supporting elements. However, Danko '404 does not disclose or suggest use of a dynamic machine model such as model 184 and absolute position sensing.

Pursuant to further useful embodiments of the present invention, the $[\theta_i^{ref}]$ and $[\theta_i]$ vectors can be actively re-connected using a closing control loop which compares $[\theta_i]$ with $[\theta_i^{ref}]$ and generates a correction signal vector for minimizing, reducing or eliminating the $[\theta_i]$-$[\theta_i^{ref}]$ difference.

Other embodiments of the present invention can include a dynamic machine motion correction model in the closing control loop. This dynamic machine motion correction model can process input signals from the position sensors of the machine links, and evaluate those signals to provide an enhanced control signal to actuators 116-120 and 126 in order to reduce or minimize the difference between $[\theta i^{ref}]$ and $[\theta i]$ during motion. The machine motion correction model, including dynamic machine model 184 and actuator error cancellation module 186, may incorporate system identification, and an intelligent, predictive control element, if desired.

Referring now to the machine control system shown in FIG. 4, this system adds to the system shown in FIG. 3 a position error correction system comprising a number of modeling components which can be used to provide a reference model against which actual machine performance can be compared, together with an error processing module. The added modeling components comprise a joint control model 180, a machine actuators model 182 and a dynamic machine model 184. Error processing is effected by a position and velocity error cancellation module 186.

Advantages can be realized with the addition of acceleration sensors or accelerometers 190 to provide absolute position signals relative to a fixed coordinate system. An accelerometer 190 can be provided at or on each of the boom 104, arm 108, shovel 112, other elements 128 and shovel or bucket 112 to monitor the acceleration of its respective host element. The invention includes embodiments wherein each accelerometer 190 can detect and report acceleration in one dimension, in two dimensions, or in three dimensions, depending upon the host machine element and the application, .i.e. the machine utilized and the operation to be performed. Desirably, acceleration is monitored continuously throughout operation of the machine to execute a trajectory prescribed by the control system and is reported to the control system by wire or wirelessly. The sensed acceleration can be processed locally, at the machine element, or centrally, at the control system to yield an absolute position signal which indicates the position of the respective element in space and time independently of the mechanical condition of the machine element or the machine articulations or joints.

Accelerometers 190 can be mounted on the machine links and can be used as absolute motion sensors, directly providing acceleration signals that can be integrated first to obtain velocities, and subsequently integrated again to obtain absolute positions. Sensors 141-147 of Danko that report the position of one moving machine element relative to another machine element which may itself also be moving are not generally suitable for providing precise and reliable position information in the absolute (ground) coordinate system. Mechanical inefficiencies such as machine link elasticity resulting in machine link sag, vibrations and other factors that cannot be detected by typical relative link position sensors are problematic.

Accelerometers 190 or other suitable sensing or observation means can be employed in embodiments of the invention to provide actuator and/or machine element position information relative to a base reference which is fixed in relation to the articulated elements of the machine. The base reference can be the ground or other machine support surface or work surface, for example, a boat deck or ice floe. Alternatively, an axis through rotatable turret 102 or ground-engaging system 101, or other suitable machine component, could be employed as a reference. The absolute position sensors on the machine can be employed to provide actual, real-world position signals of the articulated machine elements. If desired, a GPS signal can be used to provide, facilitate or supplement the absolute position information.

As illustrated in FIG. 4, joint control model 180 employs a differential control signal vector $\dot{\theta}_i^u$ generated by differential inverse kinematics model 150 to provide a model or reference velocity control signal $[\phi i^{ref}]$ containing velocity information in voltage form for any one or more of actuators 116-120 and 126. The velocity information is calculated to enable the respective actuator 116-120 or 126 to operate its associated joint in a manner which will properly assist in moving the end effector along the model reference trajectory. Differential control signal vector $\dot{\theta}_i^u$, from differential inverse kinematics model 150, is also supplied to dynamic machine model 184.

Machine actuators model 182 receives reference velocity control signal $[\phi i^{ref}]$ from joint control model 180 and employs same to generate a set of one or more reference positions $[\theta i^{ref}]$ to which one or more actuators 116-120 and 126 is to be moved.

Reference positions $[\theta i^{ref}]$ may, for example, be the link positions or other element positions of a theoretical perfectly tuned machine with no dynamic response error. Reference positions $[\theta i^{ref}]$ are output by machine actuators model 182 to dynamic machine model 184, to error cancellation module 186, and also to forward kinematics processing 158 and Jacobian generator 152.

As stated, differential control signal vector $\dot{\theta}_i^u$ and reference positions $[\theta i^{ref}]$ are input to dynamic machine model 184. In addition, dynamic machine model 184 receives actual link or element positions $[\theta i]$ of the real machine continuously sampled with time. From these or other suitable inputs, dynamic machine model 184 determines a dynamic model of each link of an ideal machine performing a desired trajectory. This model represents dynamic motion observation of each link for a sufficiently long time interval before the actual time instant, and changes with time. In a further embodiment of the invention dynamic machine model 184 provides a logical picture of a desired pattern of movement of relevant machine elements, over time, for performance of a selected end effector trajectory. In this and other embodiments of the invention the dynamic machine model can include the position, or the velocity of each machine actuator 116-120 and 126, or both the position and the velocity all sampled for a sufficiently long time interval. It will be understood that the control system may of course simply include information indicative of the respective position and/or velocity. If desired, the dynamic model can also or alternatively include position or velocity or position and velocity information for each of the movable components of boom 105, or other articulated structure, supporting shovel or bucket 112 or another end effector.

Input into position and velocity error cancellation module 186 are both the modeled reference positions [$\theta i^{ref}$], from machine actuators model 182 and the actual positions [$\theta i$] of the real machine. Error cancellation module 186 also receives the modeled input from dynamic machine model 184. From these several inputs, error cancellation module 186 generates and outputs a differential (velocity) correction signal vector $\dot{\theta}_i^c$ to integrator summator 188 and thence to joint control system 154.

To generate differential correction signal vector $\dot{\theta}_i^c$, error cancellation module 186 compares the actual machine element positions [$\theta i$] with the respective modeled reference positions [$\theta i^{ref}$] and calculates suitable corrections or adjustments to the actual or real-world machine link or element positions [$\theta i$]. The corrections or adjustments can, for example, be selected within the error cancellation module to bring the actual positions [$\theta i$] into correspondence with, or closer to, the modeled reference positions [$\theta i^{ref}$], or effect some other useful adjustment of the actual positions [$\theta i$].

Summator 188 applies a differential correction signal vector $\dot{\theta}_i^c$ as an adjustment to differential control signal vector $\dot{\theta}_i^u$ received from differential inverse kinematics model 150, which has been calculated to cause the end effector to follow a trajectory specified in trajectory generator 146. Summator 188 effects the adjustment to differential control signal vector $\dot{\theta}_i^u$ for each active one of machine actuators 116-120 and 126. The adjusted differential control signal vector $\dot{\theta}_i^u$ is supplied to joint control system 154 which outputs a real machine actuator control signal [$\phi i$], incorporating the adjustments to machine actuators 116-120 and 126. Machine actuators 116-120 and 126 move their associated movable machine elements, for example, boom 104, arm 108, bucket or shovel 112 and/or other elements 128 to have positions and/or velocities which are adjusted compared with what their values would have been without the application of differential correction signal vector $\dot{\theta}_i^c$ to bring the actual end effector trajectory closer to the reference model trajectory, or to effect other desired adjustment.

In a further embodiment of the invention, link positions signal [$\theta i^{ref}$] and control signal [$\phi i^{ref}$] are idealized signals that can produce a desired trajectory in a perfectly tuned machine with no dynamic response error. In an alternative embodiment, dynamic machine model 184 is adapted to approximate a given real-world machine, by modifying movement control relative to link positions signal [$\theta i^{ref}$] and control signal [$\phi i^{ref}$] to approximate a specific host machine. Such modification can be provided by machine learning, artificial intelligence, learning from error correction or in other appropriate manner. A benefit of the use of such an adaptive model is a closer approximation of the model to the actual signals and a reduction in amplitude of the correction vector.

A still further embodiment of the invention supplements any one or more of the above-described embodiments of the invention with an artificial intelligence component such as is referenced "162" in Danko '404 to receive input from machine actuators 116-120, 126 and human supervisor 144 to provide to trajectory generator 146 one or more trajectory families for executing desired tasks, including repetitive tasks.

As described in Danko '404, human supervisor 144 can observe the machine, and provide visual feedback 160, using joysticks 142 or other suitable input means, to adjust the tool trajectory or to select a different or modified trajectory. In another embodiment of the invention, such visual feedback can be applied to dynamic machine model 184 to provide an adjusted or re-selected machine model trajectory for reference in generating corrections.

In some embodiments of the invention, a hydraulic unit and any link or other members attached or articulated thereto which connects two machine members together across one of the pivots 106, 110 or 114 is referenced as a "link". In this case, the spatial configuration of the articulated components of the machine can be specified in terms of the angular link positions, which may be used to describe, respectively: the angle of boom 105 to turret 102; the angle of lever arm 108 to boom 105; and the angle of bucket 112 to lever arm 108. Additional angular descriptors may optionally include the rotational angle of turret 102 about a vertical axis, called "slew"; the angle of ground-engaging system 101 to the horizontal about a transverse axis (perpendicular to the paper); and, possibly, the angle of ground-engaging system 101 to the horizontal about a direction of travel axis (in the plane of the paper). Further angular descriptors may be employed for additional movable, linked mechanical structure, if desired. Any or all of such angular position descriptors may be included or implicitly referenced in the position vectors, functions or signals referenced herein, for example in reference positions [$\theta i^{ref}$], actual machine link positions [$\theta i$], differential control signal vector $\dot{\theta}_i^u$, differential correction signal vector $\dot{\theta}_i^c$, reference actuator control [$\phi i^{ref}$] and real machine actuator control signal [$\phi i$].

One example of the application of the dynamic model control system of the invention to machine control implements the technique on a small excavator having electro-hydraulic valves, link sensors, on-board control computer, and differential control architecture as described herein. Kinematics transformation including a virtual, revolute-to-Cartesian machine re-configuration and feedback control algorithms can be tested. Test results with such an excavator show that the machine is capable of performing complex tasks according to software-transformed, adjustable kinematics in Cartesian coordinates.

FIGS. 5 and 6 show bucket pin trajectories that can be measured using a camera-based, trajectory tracking method such as is described in Danko et al., "Model-based camera vision evaluation of mining machine motion," *Thirty Second International Symposium of the Application of Computers and Operational Research in the Mineral Industry*, Tucson, Ariz., 2005b.

FIG. 5 shows the measured trajectory of the bucket pin during open-loop control operation. The test task is to move the bucket pin along a square at a constant speed. Three consecutive repetitions of the same square target trajectory are made. As shown, the task is executed quite well, considering that the kinematics reconfiguration control works with open-loop hydraulic cylinder velocity control. Repeatability, however, is poor with drifting squares, due to lack of control correction means in the machine's hydraulic elements or an active overall position control. The trajectory can be seen to be somewhat noisy, which noise may largely be attributed to tracking error in the optical measurement.

The task is repeated with closed-loop control, according to the invention, in which the differences between the reference and the actual actuator positions are reduced by the controller. FIG. 6 shows the bucket pin movement with position error cancellation during motion. Repeatability of the motion trajectory is greatly improved as the overlapping movement paths in FIG. 6 demonstrate the invention's ability to correct error between relative iterations. In closed-loop control, the machine retains its good dynamic response. The dynamic response of the machine model is identified, and the model is applied in a predictive mode real-time during machine operation. The machine model, which is identified over a 60 millisecond, sliding time window in the example, is continuously updated with time every few milliseconds, providing for adjustment to link positions, to cross-effects between links, to non-linear effects, and to the errors caused by the approximations used in the model derivation.

Figure 7:
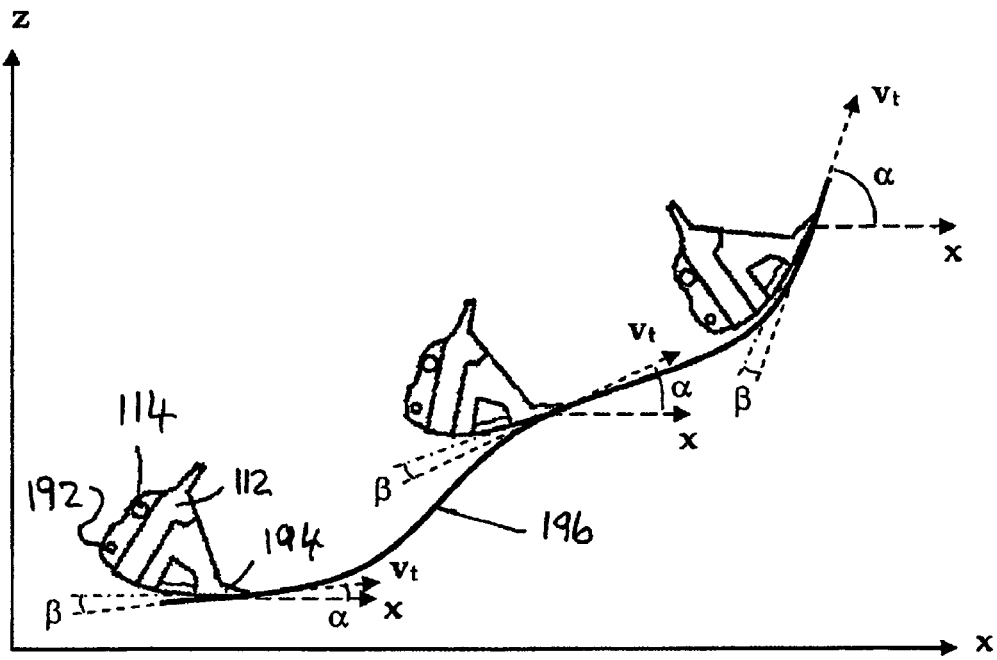
FIG. 7 is a schematic view of a bucket manipulable by a hydraulic machine such as that shown in FIG. 1 and of an undulating trajectory exhibited by an edge of the bucket as the bucket is moved.
Figure 8:
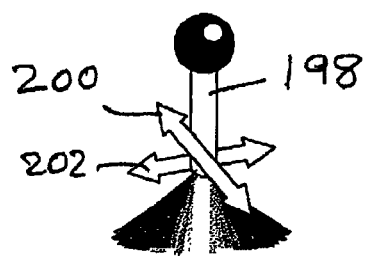
FIG. 8 is a perspective view of a lefthand joystick useful for manipulating the bucket in the manner indicated in FIG. 7.
Figure 9:
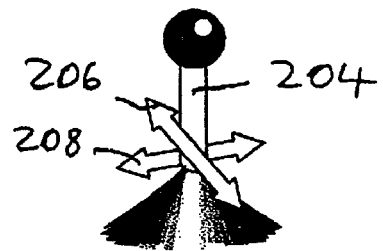
FIG. 9 is a perspective view of a righthand joystick useful for manipulating the bucket in the manner indicated in FIG. 7.

FIGS. 7-9 illustrate a simple operator input device system made possible by the control architecture disclosed in Danko '404 and herein which can provide sophisticated manipulation of a tool such as a shovel or a bucket with only two operator input devices, in this case joysticks.

It will be understood that more input devices can be employed, if desired: the use of two joysticks is advantageous and illustrative of some of the benefits attainable with the above-described invention. For an operator, greater efficiency, accuracy and productivity is likely to be obtainable if they can focus their attention on a small number of controls. The present invention accordingly includes embodiments of control system and hydraulic and other machines which utilize two manually operable input devices to achieve some or all of the functionality described herein.

FIG. 7 illustrates some of the more sophisticated maneuvers that a hydraulically powered bucket or other tool may be called upon to perform. Referring to FIG. 7, a bucket 112 is supported on the viewed side by a pivot pin 114 and is pivoted or rotated about pin 114 by a hydraulic actuator, for example shovel rotator 120 (not shown in this figure), coupled to aperture 192. Bucket 112 has a leading edge 194 which engages the work material, ground, rock face, bulk deposit or the like.

Bucket edge 194 moves along a trajectory 196 advancing toward the host machine (not shown) with a velocity vt read as a tangent to trajectory 196. The angle of the trajectory tangent to the horizontal is designated "α". Bucket edge 194 addresses the work material at a desired cutting angle β which is measured with respect to the trajectory tangent. In one embodiment of the invention, angle β is selected in the software and remains constant until, or unless, modified by the operator using a joystick as will be further described hereinbelow.

The proposed bucket steering kinematics will allow an operator to move the bucket's cutting edge along an arbitrary trajectory using three joystick axes configured to independently control speed, moving direction, and cutting edge angle relative to the movement direction.

The control system software can be effective to move bucket 112 along a selected trajectory such as 196 without further operator input. In this case, the operator can perform a useful range of adjustments or fine-tuning employing as few as two joysticks, or comparably effective controls, for example as shown in FIGS. 8-9.

Referring to FIG. 8, the control shown which is suggested for lefthand use comprises a joystick 198 capable of pivotal movement in two orthogonal, generally horizontal, directions. Back-and-forth movement can be used to control trajectory angle α, as indicated by arrow 200. Left-to-right movement can be used to control the slew angle which is the angle of rotation of the turret on the machine base, as indicated by arrow 202.

Referring to FIG. 9, the control shown which is suggested for righthand use comprises a joystick 204 also capable of pivotal movement in two orthogonal, generally horizontal, directions. Back-and-forth movement can be used to control the bucket velocity vt along the trajectory 196, as indicated by arrow 206. Left-to-right movement can be used to control, or override, the cutting angle β, as indicated by arrow 208.

The lefthand and righthand functions can, of course, be reversed, if desired. It will also be apparent that the functions shown can be assigned differently, if desired, and that different functions may be assigned, and that different input devices can be used to provide more, fewer or different functions, if desired.

Because the major control functions required to efficiently and controllably maintain and repeat the desired trajectory are assumed by the control system, automating trajectory execution, the operator is relieved of same and can concentrate on work piece selection and fine-tuning the tool movements providing better, more efficient output with reduced operator effort.

Employing the novel error-corrected control system of the invention, a coordinated system of tool trajectory curves can be efficiently machine-generated. Using the above-described, or equivalent, or comparable joystick or other suitable input device configuration, the operator may work in Cartesian space to effect software-controlled adjustments of the tool velocity, the trajectory angle, the cutting angle, and/or other parameters programmed into the joysticks or other controllers.

For example the angle of orientation of a trajectory, such as the generally square trajectory illustrated in FIG. 6, or other useful trajectory, to the ground or other work surface may be trimmed so that the tool angle, of bucket or shovel 112 or the like, is a few degrees sharper, e.g. 5° sharper, than the trajectory angle.

The error-corrected control system of the invention is useful for controlling a wide range of machinery and comparable equipment, as described in Danko '404, including, by way of example, articulated arm front loaders, mechanical shovels and the like useful for construction, digging, mining, sand, gravel, shale, limestone, ore, and other bulk material handling, open-cast mining, pit mining and the like. The invention includes such machinery and equipment embodying the novel control systems and methods described herein.

A theoretical example of the practice of the invention will now be described for illustrative purposes, which example is not intended to limit the scope of the invention which it will be understood can be practiced in a variety of other ways.

Example

Approximate Causal System Model

For an n-link machine, the joint angular positions $x_1$, $x_2, \ldots, x_n$ can be denoted by the n-vector $x=[x_1, x_2, \ldots, x_n]$. Here, the notation is changed from $\theta$ to $x$ for simplicity. A simplified motion equation can be written as a second-order vector differential equation [ref] between positions x, velocities dx/dt, and accelerations $d^2x/dt^2$:

$$M(x)\frac{d^2x}{dt^2} + D(x)\frac{dx}{dt} + S(x)x = A\left(\frac{dx}{dt}, x\right) \qquad (1)$$

In Eq (1), M(x), an n×n matrix that represents the moment of inertia and mass reduced to the joint axes. D(x), S(x) are n×n matrices of velocity-proportional drag and position-proportional spring torque coefficients, respectively. A(dx/dt, x) is an n-vector, representing an active torque vector, generated by the joint actuators. This term is a function of control signal u, velocity, and position vector variables.

Since all $x_i$ (i=1 ... n) are functions of time t, the non-linear Eq (1) can be conveniently converted into a time-variant motion equation by eliminating x from the coefficient matrices:

$$M(t)\frac{d^2x}{dt^2} + D(t)\frac{dx}{dt} + S(t)x = A\left(u, \frac{dx}{dt}, t\right) \quad (2)$$

A first-order, linear approximation (as the first term of the Taylor series) is applied to A:

$$A\left(u, x, \frac{dx}{dt}, t\right) = Ju(A)u + Jx(A)x + Jdx(A)\frac{dx}{dt} + T(t) \quad (3)$$

Where Ju(A), Jx(A), and Jdx(A) are the following Jacobian matrices:

$$Ju(A) = \begin{bmatrix} \frac{\partial A_{1,1}}{\partial u_1} & \cdots & \frac{\partial A_{1,n}}{\partial u_n} \\ \vdots & & \\ \frac{\partial A_{n,1}}{\partial u_1} & \cdots & \frac{\partial A_{n,n}}{\partial u_n} \end{bmatrix} \quad (4)$$

$$Jx(A) = \begin{bmatrix} \frac{\partial A_{1,1}}{\partial x_1} & \cdots & \frac{\partial A_{1,n}}{\partial x_n} \\ \vdots & & \\ \frac{\partial A_{n,1}}{\partial x_1} & \cdots & \frac{\partial A_{n,n}}{\partial x_n} \end{bmatrix}$$

$$Jdx(A) = \begin{bmatrix} \frac{\partial A_{1,1}}{\partial \dot{x}_1} & \cdots & \frac{\partial A_{1,n}}{\partial \dot{x}_n} \\ \vdots & & \\ \frac{\partial A_{n,1}}{\partial \dot{x}_1} & \cdots & \frac{\partial A_{n,n}}{\partial \dot{x}_n} \end{bmatrix}$$

In Eq (3), T(t) represents a time-dependent torque vector. Substituting (3) into (2), after simplification, gives:

$$M(t)\frac{d^2x}{dt^2} + [D(t) - Jdx(A)]\frac{dx}{dt} + [S(t) - Jx(A)]x = Ju(A)u + T(t) \quad (5)$$

Eq (5) can be re-arranged. For the $x_i$ (i=1 ... n) component, it reads:

$$M_{i,i}\frac{d^2x_i}{dt^2} + (D_{i,i} - Jdx_{i,i})\frac{dx_i}{dt} + (S_{i,i} - Jx_{i,i})x_i = F(t, x_j, u_j) + Ju_{i,i}u_i \quad (6)$$

Where F(t, $x_j$, $u_j$) (j≠i) is:

$$F(t, x_i, x_j, u_j) = \quad (7)$$
$$-\sum_{\substack{j=1 \\ j\neq i}}^{n}\left[M_{i,j}\frac{d^2x_j}{dt^2} + (D_{i,j} + Jdx_{i,j})\frac{dx_j}{dt} + (S_{i,j} - Jx_{i,j})x_j + Ju_{i,j}u_j\right] +$$
$$T_i$$

The set of n simultaneous differential equations in Eq (6) defines the simplified dynamic model of an n-link machine. In one embodiment, the invention provides a dynamic machine model wherein the time variant coefficients $M_{i,i}$, $D_{i,i}$, $Jx_{i,i}$, $Jdx_{i,i}$, $Ju_{i,i}$, $S_{i,i}$ and $T_i$ (i=1 ... n) are a best match to the predicted $x_i$ angular positions from a model with observed (measured) $x_i^M$ values over a sufficiently long ΔT time period, for a given ui as known control input. While alternative methods can be employed, for example, direct $x^M$ signal filtering during model building [Kalman], in the instant example, a simple least-square-fit match is applied:

$$\int_{t}^{t+\Delta T}[x_i(t) - x_i^M(t)]^2 dt = \text{minimun} \quad i = 1 \ldots n \quad (8)$$

For real-time model identification applications in the control loop, computation time is limited and simplification of Eq (6) can be helpful. Pursuant to this example, simplification can be accomplished by de-coupling the set of differential equations and assuming that the cross-effects represented by $x_i$ and $x_j$, $u_j$ (j≠i) on the left-hand side of Eq (7) are only time-dependent, yet unknown, functions. Furthermore, the time-variable coefficients in Eq (6) can be considered time-averaged constants within the sliding [t, t+ΔT] time interval. While more exact solutions may be possible, they are likely to require increased processing resources. Using such simplification, the decoupled, second-order differential equations with time-averaged coefficients for each link i are:

$$m_i\frac{d^2x_i}{dt^2} + k_i\frac{dx_i}{dt} + q_ix_i = f_i(t) + a_iu_i \quad (9)$$

In Eq (9) $m_i=M_{i,i}$, $k_i=D_{i,i}-Jx_{i,i}$, $q_i=S_{i,i}-Jx_{i,i}$, and $f_i=F(t, x_j, u_j)$, $a_i=Ju_{i,i}$ notations are used; $f_i(t)$ can be considered unknown, since it includes unknown system coefficient functions and parameters shown in Eq (7). Since the force balance of each link i is affected by the motion of the other links (j=1 ... n, j≠i) throughout $F_i(t)$ only, it is subject to identification. Eliminating indexing for simplification in notation when applying Eq (9) for each link independently, it gives:

$$\frac{d^2x}{dt^2} + P\frac{dx}{dt} + Cx = F \quad (10)$$

Where $$\left.\begin{array}{l} P = \dfrac{k_i}{m_i} \\ C = \dfrac{q_i}{m_i} \\ F = \left(\dfrac{f_i}{m_i} + \dfrac{a_iu_i}{m_i}\right) \end{array}\right\} \quad (11)$$

The motion control velocity signal u contained in F can be assumed to be a response, for example, the output of an electro-hydraulic valve. The primary control signal is the input control voltage to the electro-hydraulic valve. Such a response is primarily integrated and/or delayed, and may have linearity and accuracy problems. Accordingly, in this example, these time-variable effects are included in the task of dynamic system identification. The equation for u with time-variable constants b and d to be identified is:

$$u = b \int_{t-\Delta Tv}^{t} V d\tau + d \quad (12)$$

Where V is the time-variable voltage control signal to the actuator for each link. Here, the notation is changed from u to V for simplicity. The $\Delta Tv$ time interval can be assumed to be a suitable duration, characterizing the hydraulic system and the electro-hydraulic valve. Using the expression F from Eqs (11) and simplifying, gives:

$$F = A \int_{t-\Delta Tv}^{t} V d\tau + B \quad (13)$$

where the new constants are:

$$\left. \begin{array}{l} A = b \dfrac{a_i}{m_i} \\ B = d + \dfrac{f_i}{m_i} \end{array} \right\} \quad (14)$$

Substituting Eq (13) into Eq (10) gives:

$$\dfrac{d^2 x}{dt^2} + P \dfrac{dx}{dt} + Cx = A \int_{t-\Delta Tv}^{t} v dc + B \quad (15)$$

In conclusion of the derivation, the time variant system identification task for a given machine link at time t is to determine P, A, B, and C time-averaged constants from Eq (15) based on matching x to the measured $x^M$ using the optimization condition in Eq (8) for a given $\Delta T$ time interval. A simplified optimization task is achieved by applying a numerical, finite difference solution scheme. Discretaziation of x with time into an $x_r$ series of samples (r=1 ... N) allows for re-writing Eq (10) into a finite-difference equation:

$$\dfrac{x_{r+1} + x_{r-1} - 2x_r}{\Delta t^2} + P \dfrac{x_{r+1} - x_{r-1}}{2\Delta t} + C x_r = A \sum_{i=r-N_r}^{r} V_i + \Delta t + B \quad (16)$$

Where:

$$Nv = \dfrac{\Delta Tv}{\Delta t}$$

Matching $x_r$ with the measured $x_r^M$ values in a least-squares-fit sense over N samples is equivalent of replacing $x_r$ with $x_r^M$ in Eq (16) and solving for P, A, B,C from an over-determined set of N−2 equations (if N>6):

$$\begin{bmatrix} \dfrac{x_3^M + x_1^M - 2x_2}{\Delta t^2} \\ \vdots \\ \dfrac{x_N^M + x_{N-2}^M - 2x_{N-1}}{\Delta t^2} \end{bmatrix} = \begin{bmatrix} \dfrac{x_1^M - x_3^M}{2\Delta t^2} & \sum_{i=2-Nv}^{2} V_i & 1 & -x_2^M \\ \vdots & & & \\ \dfrac{x_{N-2}^M - x_N^M}{2\Delta t^2} & \sum_{i=N-Nv-1}^{N-Nv-1} V_i & 1 & -x_{N-1}^M \end{bmatrix} \begin{bmatrix} P \\ A \\ B \\ C \end{bmatrix} \quad (17)$$

In the application example, N=30 is used, while Nv=5 and $\Delta T$=2 ms. These figures provide an approximate sliding time window for dynamic model identification of 60 ms.

Once P, A, B, C model constant are determined from Eq (17), Eq (16) can be used for numerically solving the time variable position $x_r$ from an initial position. The solution can be used for position interpolation (when $t < t_{present}$), filtering (when $t = t_{present}$), or prediction (when $t > t_{present}$), with control vector V, which can include forward-predicted elements for $t > t_{present}$. In the application example, the dynamic machine mode is applied for a one time-step, forward prediction of the motion of each machine link.

In summary, the efficiency of a model-based, intelligent, adaptive control is limited. The invention provides a more efficient solution by employing a simplified system model-component combined with absolute sensory signal contribution. A simple method, based on first principles, is developed as an example for extracting a causal, second-order model from noisy, measured system responses. Although fifth or even higher order models are routinely expected in hydraulic system applications, as described for example by Walters, R. B., *Hydraulic and Electric-Hydraulic Control Systems*, Second Enlarged Edition, Kluwer Academic Publishing, Norwell, Mass., 2000, the invention is able, surprisingly, to provide an effective solution using low-order, but nevertheless time-variant, model application.

The present invention includes machines and mechanical systems equipped with the novel control systems described herein as well as methods of operation of machines and mechanical systems which employ the novel control methods disclosed herein.

The foregoing detailed description is to be read in light of and in combination with the preceding background and invention summary descriptions wherein information regarding the invention and its practice may be set forth and wherein modifications, alternative and useful embodiments of the invention may be suggested or set forth, as will be apparent to one skilled in the art.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. A control method for controlling a mechanical arm to perform a desired task, the mechanical arm comprising a support, multiple links, and an end effector, the end effector being a work implement supported by the links for movement relative to the support, multiple joints connecting the multiple links one to another, to the support and to the end effector, each joint being movable to different joint positions to effect relative movement of the members connected by the respective joint, and multiple controllable actuators to effect the joint movements, wherein the method employs a control system, and wherein the method comprises:

based upon input from an operator, selecting a virtual kinematics configuration and defining a trajectory in real time; and with the control system, controlling the actuators to move the end effector along the trajectory by:

generating an input control vector for each link from a control signal vector outside of a closed negative feedback loop, each input control vector comprising, at each of a series of system-determined time intervals, a reference position for each link according to the selected virtual differential kinematics configuration;

adjusting the control signal vector with an error correction vector, if any, supplied through the closed negative feedback loop;

generating an output position vector based upon measurements of the actual position of each link at each respective time interval under operation of the actuators according to the adjusted control signal vector;

determining a dynamic motion model of the motion of each link of the mechanical arm by relating for each link the elements of the input control vector to the elements of the output position vector to provide time-variable constant coefficients for each time interval, wherein the dynamic motion model incorporates dynamics components including acceleration;

updating the error correction vector using the dynamic motion model and differences between measured actual link positions from the output position vector and corresponding reference positions from the input control vector; and transmitting the updated error correction vector in the closed negative feedback control loop for adjustment of the control signal vector.

2. A control method according to claim 1, wherein the time interval comprises a sliding time window.

3. A control method according to claim 2, wherein identifying of the coefficients for the dynamic motion model comprises obtaining a least-square fit of elements of the input control vector to elements of the output position vector.

4. A control method according to claim 2 comprising using the dynamic motion model obtained for a previous time window to identify the time-variable constant coefficients.

5. A control method according to claim 2 wherein the control system comprises a motion control unit for each actuator and the method comprises, as part of the adjusting the control signal vector, supplying each actuator input of the control signal vector as a positive input to a summator for the motion control unit of the respective actuator to generate the desired link motion.

6. A control method according to claim 5 further comprising, as part of the adjusting the control signal vector, subtracting a corresponding error signal of the error correction vector from the positive input to each link summator to diminish the determined motion error.

7. A control method according to claim 1 comprising providing absolute position information regarding at least one movable machine element to the control system to facilitate determination of the end effector position.

8. A control method according to claim 7 wherein the absolute position information comprises absolute position information regarding each movable machine element.

9. A method of operating an excavator comprising a hydraulically actuated mechanical arm, the method comprising controlling the hydraulically actuated mechanical arm by a control method according to claim 1.

10. A hydraulic machine control system for controlling a hydraulically actuated mechanical arm to perform a desired task, the mechanical arm comprising a support, multiple links, and an end effector, the end effector being a work implement supported by the links for movement relative to the support, multiple joints connecting the multiple links one to another, to the support and to the end effector, each joint being movable to different joint positions to effect relative movement of the members connected by the respective joint, and multiple controllable actuators to effect the joint movements, wherein the hydraulic machine control system is configured to control the actuators to move the end effector and comprises:

a number of selectable virtual machine kinematics configurations providing end effector trajectory families for performing different tasks;

an operator interface comprising operator input devices, the operator interface enabling an operator to select a desired one of the virtual machine kinematics configurations for the movement of the end effector and to define a desired trajectory within the virtual kinematics of the end effector movement in real time to perform the desired task;

a joint control system configured to:

generate an input control vector for each link from a control signal vector outside of a closed negative feedback loop, each input control vector comprising, at each of a series of system-determined time intervals, a reference position for each link according to the virtual differential kinematics configuration for the desired trajectory;

adjust the control signal vector with an error correction vector, if any, supplied through the closed negative feedback loop; and generate an output position vector based upon measurements of the actual position of each link at each respective time interval under operation of the actuators according to the adjusted control signal vector;

a dynamic joint model module configured to determine a dynamic motion model of the motion of each link of the mechanical arm by relating for each link the elements of the input control vector to the elements of the output position vector to provide time-variable constant coefficients for each time interval, wherein the dynamic motion model incorporates dynamics components including acceleration; and a position and velocity error corrector configured to update the error correction vector using the dynamic motion model and differences between measured actual link positions from the output position vector and corresponding reference position positions from the input control vector; and wherein the joint control system is configured to apply the error correction vector in the closed negative feedback control loop.

11. A hydraulic machine control system according to claim 10 wherein the time interval comprises a sliding time window.

12. A hydraulic machine control system according to claim 11 wherein the control system comprises a motion control unit for each actuator and the control system is configured to, as part of the adjusting the control signal vector, supply each input signal of the control signal vector as a positive input to a summator for the motion control unit of the respective actuator for each link to generate the desired motion.

13. A hydraulic machine control system according to claim 12 wherein the control system is further configured, as part of the adjusting the control signal vector, to subtract an error signal of the error correction vector from the positive input to each link summator to diminish the determined motion error.

14. An excavator comprising a hydraulic machine control system according to claim 10.

15. A method of controlling a mechanical arm, the method comprising:
   determining initial control signals;
   supplying the initial control signals to an actual machine control sub-system that incorporates an error-correction feedback loop and to a virtual machine model outside of the error-correction feedback loop;
   with the virtual machine model outside of the error-correction feedback loop, determining a reference position vector that results from applying the supplied initial control signals to the virtual machine model;
   with the actual machine control sub-system that incorporates the error-correction feedback loop:
      combining the supplied initial control signals with error-correction signals, if any, supplied through the error-correction feedback loop;
      using the combined control signals to control the mechanical arm;
      measuring results of using the combined control signals to control the mechanical arm;
      determining an actual position vector from the measured results;
      updating the error-correction signals depending on the actual position vector, the reference position vector, and a dynamic motion model of the mechanical arm, wherein for current operating conditions the dynamic motion model reconciles differences between the actual position vector and the reference position vector to provide time-variable coefficients for the dynamic motion model, and wherein the dynamic motion model incorporates dynamics components including acceleration; and
      supplying the error-correction signals as part of the error-correction feedback loop for combination with initial control signals.

16. The method of claim 15 wherein the determining the initial control signals includes using a differential inverse kinematics model to calculate the initial control signals based upon operator input and a trajectory path for the mechanical arm.

17. The method of claim 15 further comprising, as part of the actual machine control sub-system that incorporates the error-correction feedback loop:
   updating the dynamic motion model to adjust for discrepancies between results of using the initial control signals to control the virtual machine model and the results of using the combined control signals to control the mechanical arm.

* * * * *